June 17, 1969  AKIRA YASUDA  3,450,463

PHOTOGRAPHIC OBJECTIVE FOR PRECISION COPYING

Filed Sept. 1, 1965

INVENTOR.
AKIRA YASUDA
BY
ATTORNEY

United States Patent Office 3,450,463
Patented June 17, 1969

3,450,463
PHOTOGRAPHIC OBJECTIVE FOR PRECISION COPYING
Akira Yasuda, Tokyo, Japan, assignor to Nippon Kogaku K.K., Tokyo, Japan, a corporation of Japan
Filed Sept. 1, 1965, Ser. No. 484,289
Claims priority, application Japan, Sept. 4, 1964, 39/50,217; Sept. 15, 1964, 39/52,767
Int. Cl. G02b 1/00, 9/62
U.S. Cl. 350—177      2 Claims

ABSTRACT OF THE DISCLOSURE

An objective lens for copying comprising two single element front components and four rear components totaling seven elements, the objective having an aperture ratio of F/1.2.

---

This invention relates to a photographic objective for precision copying.

Photographic objectives for copying, particularly microcopying, must be superior in resolving power, since their reduced images are required to be extremely sharp.

This invention contemplates providing a photographic objective for copying, and comprises two front components, each of one element, and four rear components of a total seven elements. With this invention, aberrations such as coma, astigmatism and curvature of image field are highly and effectively corrected. Providing such high degree of correction for these aberrations results in successful realization of an objective system which has an aperture ratio of F/1.2 and a resolving power substantially equal to a resolving limit determined by a diffraction phenomenon of a total of 1,000 lines in a 1 mm. wide area through any area of image field, for the e-line of the spectrum and at a magnification of 1/25.

Figure 1:
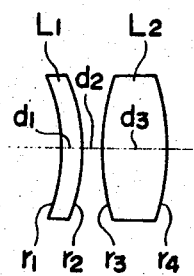
Figure 1:
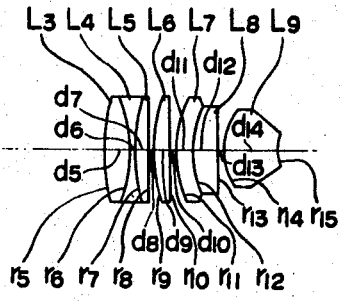
Figure 2:
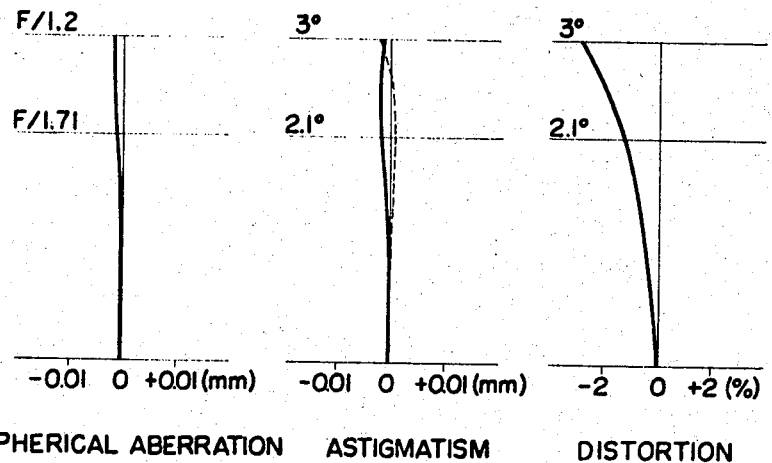

The features and the advantages of the invention will be described in detail in conjunction with the accompanying drawing in which:

FIG. 1 is a sectional view of a photographic objective for precision copying embodying the invention; and FIG. 2 shows the graphs of spherical aberration, astigmatism and distortion of the photographic objective having a focal length designated as 100 mm.

In the objective system in accordance with the invention, referring to FIG. 1, the first component $L_1$ is a negative meniscus with the concave surface toward the object, the second component $L_2$ a positive element, the third component $L_3$, $L_4$ and $L_5$ a cemented negative component nearly devoid of refractive power, the fourth component $L_6$ a positive element, the fifth component $L_7$ and $L_8$ a cemented positive component, and the sixth component $L_9$ a positive meniscus, the system satisfying the following conditions:

(1) The ratio of the curvatures of the rear $(r_2)$ to front $(r_1)$ faces of the first component $(L_1)$ lies between 0.8 and 2.0;

(2) The radius of curavture $r_{11}$ of the object-side surface of the fifth component $L_7$ is between $0.6 f$ and $1.5 f$; and (3) The ratio of the curvature $r_{14}$ of the object-side face of the sixth component $L_9$ to the sum of the curvature $r_{15}$ of its image-side face and its optical axis thickness $d_{14}$ lies between 0.3 and 1.0; where $f$ is the focal length of the objective.

The inventive photographic objective for precision copying being used in the range of 4800 A.–6500 A. wavelengths, required corrections for chromatic aberration may to some degree be mitigated; but, it is necessary to observe a drastic practice of corrections on the basis of oblique light rays for such aberrations, among others, as coma, astigmatism and curvature of image field, should the resolving power be made powerful enough to approximate the limits set by the diffraction phenomenon. Condition (1) of the first component $L_1$ may work so that both surfaces of the prescribed radii of curvature, respectively, should negate each other the adverse influences on the corrections for oblique light rays for astigmatism and curvature of image field. The upper limit of the condition signifies the degradation extreme of astigmatism and curvature of image field in the negative direction while the lower limit thereof those in the positive direction.

In addition to condition (1) given to component $L_1$, condition (2) given to the radius of curvature of element $L_7$, one of the rear components, serves considerably to correct for coma as well as for spherical aberration. Furthermore, condition (3) on the relation of the radii of curvature and the central thickness of component $L_9$, serves fully for effective correction for both astigmatism and curvature of the image field in addition to correction for image distortion. Successful corrections of such order of magnitude in addition to the other minor corrections thereby produced, enable realization of a photographic objective for copying with extremely high resolving power of a total of 1,000 lines in a 1 mm. wide area at a magnification of 1/25.

A photographic objective as a form of embodiment of the invention is illustrated in FIG. 1. Two numerical examples of the illustrative embodiment of FIG. 1 are below given, where $\beta$ denoting the reduction magnification, $f$ the overall focal length; $r$, $d$, $n_e$ and $v_d$, respectively, the radius of curvature, the thickness of the element or the air spacing between elements, except $d_0$ which is the object distance, the refractive index and the Abbé number. It is noted that in the following Examples 1 and 2 $\beta$ is preceded by a minus sign which means inverted image.

EXAMPLE 1 (Data)
$[\beta=-0.04 \quad f=100]$

| | | $n_e$ | $v_d$ |
|---|---|---|---|
| $r_1=-150.037$ | $d_0=2,006.767$ | 1.0 | |
| | $d_1=16.943$ | 1.74687 | 27.7 |
| $r_2=-200.400$ | $d_2=19.112$ | 1 | |
| $r_3=+738.733$ | $d_3=50.424$ | 1.60752 | 38.1 |
| $r_4=-738.733$ | $d_4=487.970$ | 1 | |
| $r_5=+290.546$ | $d_5=22.026$ | 1.44850 | 67.0 |
| $r_6=-117.350$ | $d_6=5.083$ | 1.69402 | 31.2 |
| $r_7=+525.246$ | $d_7=9.149$ | 1.69451 | 54.8 |
| $r_8=-4,676.381$ | $d_8=3.049$ | 1.0 | |
| $r_9=+165.330$ | $d_9=17.079$ | 1.62598 | 57.9 |
| $r_{10}=\infty$ | $d_{10}=2.440$ | 1.0 | |
| $r_{11}=+95.730$ | $d_{11}=17.282$ | 1.59865 | 39.3 |
| $r_{12}=+60.996$ | $d_{12}=22.026$ | 1.43498 | 94.9 |
| $r_{13}=+3,388.682$ | $d_{13}=1.627$ | 1.0 | |
| $r_{14}=+41.352$ | $d_{14}=52.321$ | 1.51871 | 64.1 |
| $r_{15}=+26.330$ | | | |

EXAMPLE 2 (Data)
[β=−0.03766  f=100]

|  |  | $n_e$ | $v_d$ |
|---|---|---|---|
| $r_1=-152.244$ | $d_0=2,182.795$ | 1.0 |  |
| $r_2=-203.043$ | $d_1=17.273$ | 1.74687 | 27.7 |
| $r_3=746.191$ | $d_2=19.484$ | 1.0 |  |
| $r_4=-778.319$ | $d_3=51.404$ | 1.60752 | 28.1 |
| $r_5=296.196$ | $d_4=483.643$ | 1.0 |  |
| $r_6=-121.021$ | $d_5=22.455$ | 1.44850 | 67.0 |
| $r_7=466.370$ | $d_6=5.182$ | 1.69402 | 31.2 |
| $r_8=-4,767.733$ | $d_7=9.327$ | 1.69451 | 54.8 |
| $r_9=168.546$ | $d_8=3.109$ | 1.0 |  |
| $r_{10}=\infty$ | $d_9=17.411$ | 1.62598 | 57.9 |
| $r_{11}=99.665$ | $d_{10}=2.487$ | 1.0 |  |
| $r_{12}=62.183$ | $d_{11}=17.618$ | 1.59865 | 39.3 |
| $r_{13}=3,454.589$ | $d_{12}=22.455$ | 1.43498 | 94.9 |
| $r_{14}=42.156$ | $d_{13}=1.658$ | 1.0 |  |
| $r_{15}=26.264$ | $d_{14}=53.408$ | 1.51871 | 64.1 |

Seidel coefficients for the two examples of the invention are as follows, where I, II, III, IV and V in the table denote, respectively, the spherical and the comatic aberration, curvature of meridional image, curvature of sagital image and distortion.

With respect to Example 1:

|  | I | II | III | IV | V |
|---|---|---|---|---|---|
| $r_1$ | −0.0204190 | 0.1855268 | −5.1572380 | −1.7858697 | 17.9050106 |
| $r_2$ | 0.0014546 | −0.0151618 | 0.5490924 | 0.2330368 | −4.2130868 |
| $r_3$ | 0.0052820 | −0.0069282 | 0.0452220 | 0.0270468 | −0.0340920 |
| $r_4$ | 0.0006884 | −0.0095876 | 0.4185096 | 0.1514760 | −2.0422458 |
| $r_5$ | 0.0024084 | 0.0154704 | 0.3355710 | 0.1368350 | 0.9170488 |
| $r_6$ | −0.0677056 | −0.0264852 | −0.0610588 | −0.0403378 | −0.0105240 |
| $r_7$ | 0.0000014 | 0.0000104 | 0.0002168 | 0.0000798 | 0.0004694 |
| $r_8$ | 0 | 0.0000094 | −0.0011412 | 0.0016738 | −0.6573066 |
| $r_9$ | 0.0199022 | 0.0909288 | 1.3281950 | 0.4973112 | 3.3513870 |
| $r_{10}$ | 0.0105326 | −0.0298402 | 0.2536212 | 0.0845405 | −0.0709502 |
| $r_{11}$ | 0.0004730 | 0.0023582 | 0.1699390 | 0.1464294 | 1.7452728 |
| $r_{12}$ | −0.0101474 | −0.0388698 | −0.4877948 | −0.1900124 | −1.0140052 |
| $r_{13}$ | 0.0452280 | −0.0300114 | 0.0565976 | 0.0167692 | 0.0158426 |
| $r_{14}$ | −0.0026136 | −0.0130024 | 0.0963578 | 0.2257214 | 4.3142912 |
| $r_{15}$ | 0.0153812 | −0.1202268 | 2.3631616 | 0.4836776 | 2.6133936 |
| Σ | 0.0004662 | 0.0041916 | −0.0907488 | 0.0116225 | 21.8475054 |

With respect to Example 2:

|  | I | II | III | IV | V |
|---|---|---|---|---|---|
| $r_1$ | −0.0221570 | 0.1917988 | −5.0922836 | −1.7717496 | 16.7705988 |
| $r_2$ | 0.0017554 | −0.0174060 | 0.6013530 | +0.2561758 | −4.0706004 |
| $r_3$ | 0.0053600 | −0.0058276 | 0.0391120 | 0.0264402 | −0.0270014 |
| $r_4$ | 0.0006782 | −0.0092118 | 0.3945462 | 0.1443650 | −1.9019846 |
| $r_5$ | 0.0024170 | 0.0152760 | 0.3311408 | 0.1380436 | 0.9172550 |
| $r_6$ | −0.0674866 | −0.0250204 | −0.0606478 | −0.0420954 | −0.0115950 |
| $r_7$ | 0.0000022 | 0.0000134 | 0.0002530 | 0.0000940 | 0.0005106 |
| $r_8$ | 0 | +0.0000092 | 0.0064432 | 0.0044228 | −0.6656546 |
| $r_9$ | 0.0197460 | 0.0888812 | 1.2908844 | 0.4907400 | 2.2992196 |
| $r_{10}$ | 0.0110716 | −0.0303514 | 0.2496116 | 0.0832038 | −0.0805182 |
| $r_{11}$ | 0.0001808 | 0.0008888 | 0.1622606 | 0.1535230 | 1.6845782 |
| $r_{12}$ | −0.0100430 | −0.0378424 | −0.4733234 | −0.1881388 | −0.968711 |
| $r_{13}$ | 0.0467970 | −0.0300798 | 0.0545202 | 0.0158514 | 0.0133208 |
| $r_{14}$ | −0.0034402 | −0.0168746 | 0.0732616 | 0.2388056 | 4.0567764 |
| $r_{15}$ | 0.0152726 | −0.1208364 | 2.3518630 | 0.4397626 | 2.6489800 |
| Σ | 0.0001540 | 0.0033986 | −0.0710052 | −0.0105560 | 20.6651742 |

FIG. 2 which illustrates curves of spherical aberration, astigmatism and distortion of image, demonstrates the successful corrections for these aberrations.

I claim:

1. A photographic objective for precision copying comprising a first lens component $L_1$, a second lens component $L_2$, a third lens component consisting of cemented lenses $L_3$, $L_4$ and $L_5$, a fourth lens component $L_6$, a fifth lens component consisting of cemented lenses $L_7$ and $L_8$, and a sixth lens component $L_9$, the first component being a negative meniscus with its concave surface toward the object, the sixth component $L_9$ being a positive meniscus with its concave surface toward the image, the arrangement of lenses satisfying the following conditions:

Overall focal length: $f=100$
Reduction magnification: $\beta=-0.04$ (inverted image)

|  |  | $n_e$ | $v_d$ |
|---|---|---|---|
| $r_1=-150.037$ | $d_0=2,006.767$ | 1.0 |  |
| $r_2=-200.400$ | $d_1=16.943$ | 1.74687 | 27.7 |
| $r_3=+738.733$ | $d_2=19.112$ | 1 |  |
| $r_4=-738.733$ | $d_3=50.424$ | 1.60752 | 38.1 |
| $r_5=+290.546$ | $d_4=487.970$ | 1 |  |
| $r_6=-117.350$ | $d_5=22.026$ | 1.44850 | 67.0 |
| $r_7=+525.246$ | $d_6=5.083$ | 1.69402 | 31.2 |
| $r_8=-4,676.381$ | $d_7=9.149$ | 1.69451 | 54.8 |
| $r_9=+165.330$ | $d_8=3.049$ | 1.0 |  |
| $r_{10}=\infty$ | $d_9=17.079$ | 1.62598 | 57.9 |
| $r_{11}=+95.730$ | $d_{10}=2.440$ | 1.0 |  |
| $r_{12}=+60.996$ | $d_{11}=17.282$ | 1.59865 | 39.3 |
| $r_{13}=+3,388.682$ | $d_{12}=22.026$ | 1.43498 | 94.9 |
| $r_{14}=+41.352$ | $d_{13}=1.627$ | 1.0 |  |
| $r_{15}=+26.330$ | $d_{14}=52.321$ | 1.51871 | 64.1 | where $n_e$ denotes the refractive index for the $e$-line of the spectrum of the successive lenses and air spaces therebetween in their order from the object to the image side of the objective; $r$ subscript the radius of curvature of the lenses in such order; $d$ subscript the thickness of the lens component or the air spacing therebetween in such order on the optical axis, except that $d_0$ is the distance to the object, and $v_d$ the Abbé number of the lenses in such order.

2. A photographic objective for precision copying comprising a first lens component $L_1$, a second lens component $L_2$, a third lens component consisting of cemented lenses $L_3$, $L_4$ and $L_5$, a fourth lens component $L_6$, a fifth lens component consisting of cemented lenses $L_7$ and $L_8$, and a sixth lens component $L_9$, the first component being a negative meniscus with its concave surface toward the object, the sixth component $L_9$ being a positive meniscus with its concave surface toward the image, the arrangement of lenses satisfying the following conditions:

Overall focal length: $f=100$
Reduction magnification: $\beta=-0.03766$ (inverted image)

|  |  | $n_e$ | $v_d$ |
|---|---|---|---|
| $r_1=-152.244$ | $d_0=2,182.795$ | 1.0 |  |
| $r_2=-203.043$ | $d_1=17.273$ | 1.74687 | 27.7 |
| $r_3=746.191$ | $d_2=19.484$ | 1.0 |  |
| $r_4=-778.319$ | $d_3=51.404$ | 1.60752 | 28.1 |
| $r_5=296.196$ | $d_4=483.643$ | 1.0 |  |
| $r_6=-121.021$ | $d_5=22.455$ | 1.44850 | 67.0 |
| $r_7=466.370$ | $d_6=5.182$ | 1.69402 | 31.2 |
| $r_8=-4,767.733$ | $d_7=9.327$ | 1.69451 | 54.8 |
| $r_9=168.546$ | $d_8=3.109$ | 1.0 |  |
| $r_{10}=\infty$ | $d_9=17.411$ | 1.62598 | 57.9 |
| $r_{11}=99.665$ | $d_{10}=2.487$ | 1.0 |  |
| $r_{12}=62.183$ | $d_{11}=17.618$ | 1.59865 | 39.3 |
| $r_{13}=3,454.589$ | $d_{12}=22.455$ | 1.43498 | 94.9 |
| $r_{14}=42.156$ | $d_{13}=1.658$ | 1.0 |  |
| $r_{15}=26.264$ | $d_{14}=53.408$ | 1.51871 | 64.1 | where $n_e$ denotes the refractive index for the $e$-line of the spectrum of the successive lenses and air spaces therebetween in their order from the object to the image side of the objective; $r$ subscript the radius of curvature of the lenses in such order; $d$ subscript the thickness of the lens component or the air spacing therebetween in such order of the optical axis, except that $d_0$ is the distance to the object, and $\nu_d$ the Abbé member of the lenses in such order.

References Cited

UNITED STATES PATENTS 3,174,396  3/1965  Ruben _____ 350—215 X

FOREIGN PATENTS 315,159  9/1956  Switzerland.

JOHN K. CORBIN, *Primary Examiner.*

U.S. Cl. X.R.

350—215